United States Patent [19]

Herr et al.

[11] E Re. 29,972

[45] Reissued Apr. 24, 1979

[54] SAFETY LOCKOUT SYSTEM FOR SEWING MACHINES

[75] Inventors: John A. Herr, Garwood; Oswald M. Porter, Livingston, both of N.J.

[73] Assignee: The Singer Company, New York, N.Y.

[21] Appl. No.: 868,006

[22] Filed: Jan. 9, 1978

Related U.S. Patent Documents

Reissue of:

[64] Patent No.: 3,985,087
Issued: Oct. 12, 1976
Appl. No.: 589,167
Filed: Jun. 23, 1975

[51] Int. Cl.[2] ..... D05B 3/02
[52] U.S. Cl. ..... 112/158 R; 112/237
[58] Field of Search ..... 112/158 R, 158 E, 157, 112/237, 238, 239, 260

[56] References Cited

U.S. PATENT DOCUMENTS

| | | | |
|---|---|---|---|
| 2,280,289 | 4/1942 | Gerber | 112/158 R |
| 2,757,626 | 8/1956 | Fujita | 112/158 R |
| 3,552,337 | 1/1971 | Hanyu et al. | 112/158 R |
| 3,815,532 | 6/1974 | Weisz et al. | 112/237 X |

*Primary Examiner*—Peter Nerbun
*Attorney, Agent, or Firm*—Robert E. Smith; Edward L. Bell; William V. Ebs

[57] ABSTRACT

This disclosure relates to means for preventing the reciprocating needle of a sewing machine from operating in a zig-zag mode when a straight stitch throat plate means is positioned on the work bed surface. A latching means is provided for selective interconnection between the zig-zag jogging mechanism and the needle mechanism with said latching means being responsive to movement of the presser mechanism for unlatching the latching means. A locking mechanism is also provided to lock the latching mechanism in an unlatched position.

20 Claims, 3 Drawing Figures

SAFETY LOCKOUT SYSTEM FOR SEWING MACHINES

Matter enclosed in heavy brackets [ ] appears in the original patent but forms no part of this reissue specification; matter printed in italics indicates the additions made by reissue.

BACKGROUND OF THE INVENTION

This invention relates to a safety lockout mechanism for preventing a sewing machine from operating in a zig-zag mode when a throat plate means is present on the work bed surface which is capable of receiving only reciprocation of the needle in a straight stitch mode. As is known in the art during zig-zag stitching the needle of the sewing machine is moved laterally or from side to side while at the same time reciprocating up and down with respect to the throat plate which is supported on the work bed surface of the sewing machine. In order to accommodate the side to side or lateral movement of the sewing machine needle a zig-zag throat plate is provided which has an enlarged aperture formed to accommodate the maximum lateral movement of the needle during zig-zag stitching. During straight stitch operation however the throat plate is not provided with such an enlarged aperture but is only provided with a sufficiently large aperture to accommodate the needle during its substantially straight line reciprocation whereby maximum support of the work on the work bed is provided. It will be apparent that, if a straight stitch throat plate is present on the work bed surface when the machine is placed in a zig-zag mode, the needle will [have] not have a large enough throat plate aperture to penetrate during lateral movement thereof which may result in breaking of the needle with resultant possible injury to the operator and/or damage to the machine.

Co-pending U.S. patent application Ser. No. 520,084, filed Nov. 1, 1974, *(now U.S. Pat. No. 3,926,133)* by Kenneth D. Adams et al. discloses a sewing machine capable of producing both zig-zag and straight stitching wherein means are provided for positively locking the zig-zag jogging mechanism during presence of a straight stitch throat plate means so that the jogging mechanism is positively prevented from initiating lateral movement of the needle bar. In general the mechanism disclosed in said co-pending application comprises the insertion of a pin into an aperture in a link member of the jogging mechanism for physically restraining any jogging motion thereof. In contrast to the mechanism just referred to, the mechanism of the present invention provides a means for physically locking the jogging mechanism with the needle bar during the zig-zag mode and for uncoupling the jogging mechanism from the needle bar during the straight stitch mode. Thus according to the structure of the present invention there is an absence of strain on the elements of the jogging mechanism since during the zig-zag mode the jogging mechanism is capable of freely initiating the lateral jogging movement while during the straight stitch mode the jogging mechanism is completely uncoupled so that there is no restraint placed on said mechanism.

GENERAL DESCRIPTION OF THE INVENTION

The present invention relates to a novel safety mechanism for preventing the initiation of zig-zag motion to the needle mechanism of a sewing machine when the operator has selected a straight stitch mode of operation. In accordance with the present invention a latching mechanism is provided which serves to positively latch the jogging mechanism which initiates zig-zag motion into engagement with the needle mechanism when the zig-zag mode of operation is selected. The latching mechanism is operatively connected to the presser bar mechanism so that when the presser bar mechanism control member is lifted the latching mechanism is positioned for unlatching the jogging mechanism which initiates zig-zag motion. A locking mechanism is provided for locking the latching mechanism in its unlatched position. The locking mechanism further includes means responsive to the presence of a zig-zag stitch throat plate on the work bed surface for unlocking the latching mechanism. More specifically, the latching mechanism comprises a coupling member which is normally biased in a direction for uncoupling the jogging mechanism actuator from the needle bar mechanism. A camming member is provided for initiating movement of the coupling member toward a position for coupling the jogging mechanism actuator with the needle bar mechanism. The camming member itself is biased toward a position for urging the coupling member into coupling engagement with the needle bar mechanism and the jogging mechanism actuator. The camming member is also operatively connected to the presser bar mechanism in a manner such that when the presser bar mechanism control member is lifted the camming member will be displaced to a position wherein the bias of the coupling member is permitted to uncouple the jogging mechanism actuator from the needle bar mechanism. When the coupling member is in the latter mentioned position the locking mechanism may become operative for locking the camming member in the position wherein the coupling member is uncoupled as previously described. The return movement of the presser bar mechanism control member is at this time ineffective to change the position of the camming member. It is customary in some sewing machines that, when a change is made from a zig-zag mode to a straight stitch mode a change in throat plates is necessary, since the throat plate aperture for receiving the needle in a zig-zag mode is different from a throat plate aperture used in combination with the needle during the straight stitch mode. In order to change the throat plate, the presser bar control member is lifted to raise the presser foot at which time the throat plates may be interchanged. When a zig-zag stitch throat plate is inserted in the work bed surface it is operative for actuating a switch mechanism which is operatively connected in turn to the locking mechanism for unlocking the camming member and thereby place the latching mechanism in a latched position. Therefore, it will be seen that the presser bar mechanism is operatively connected to the latching mechanism for unlatching the jogging mechanism actuator from the needle bar mechanism and that the locking mechanism is operative for locking the latching mechanism in the unlatched condition so that the sewing machine needle bar mechanism will be prevented from any zig-zag motion *and constrained so as to position the needle in alignment with the throat plate needle hole* while the machine is in the straight stitch mode. The locking mechanism includes means responsive to a zig-zag throat plate for unlocking the latching mechanism and permit the coupling member to return to its latching position.

Accordingly, it is one object of the present invention to provide a novel and improved safety mechanism for a sewing machine.

It is another object of the invention to provide a novel and improved mechanism for uncoupling the zig-zag mechanism of a sewing machine when the machine is in the straight stitch mode.

It is a further object of the invention to provide a novel and improved safety mechanism for a sewing machine which is operatively connected to the presser bar mechanism for uncoupling the zig-zag mechanism when a straight stitch mode of sewing is selected.

Other objects and advantages of the present invention will be best understood when reading the following detailed description with the accompanying drawings as identified below.

DETAILED DESCRIPTION OF THE INVENTION

Figure 1:
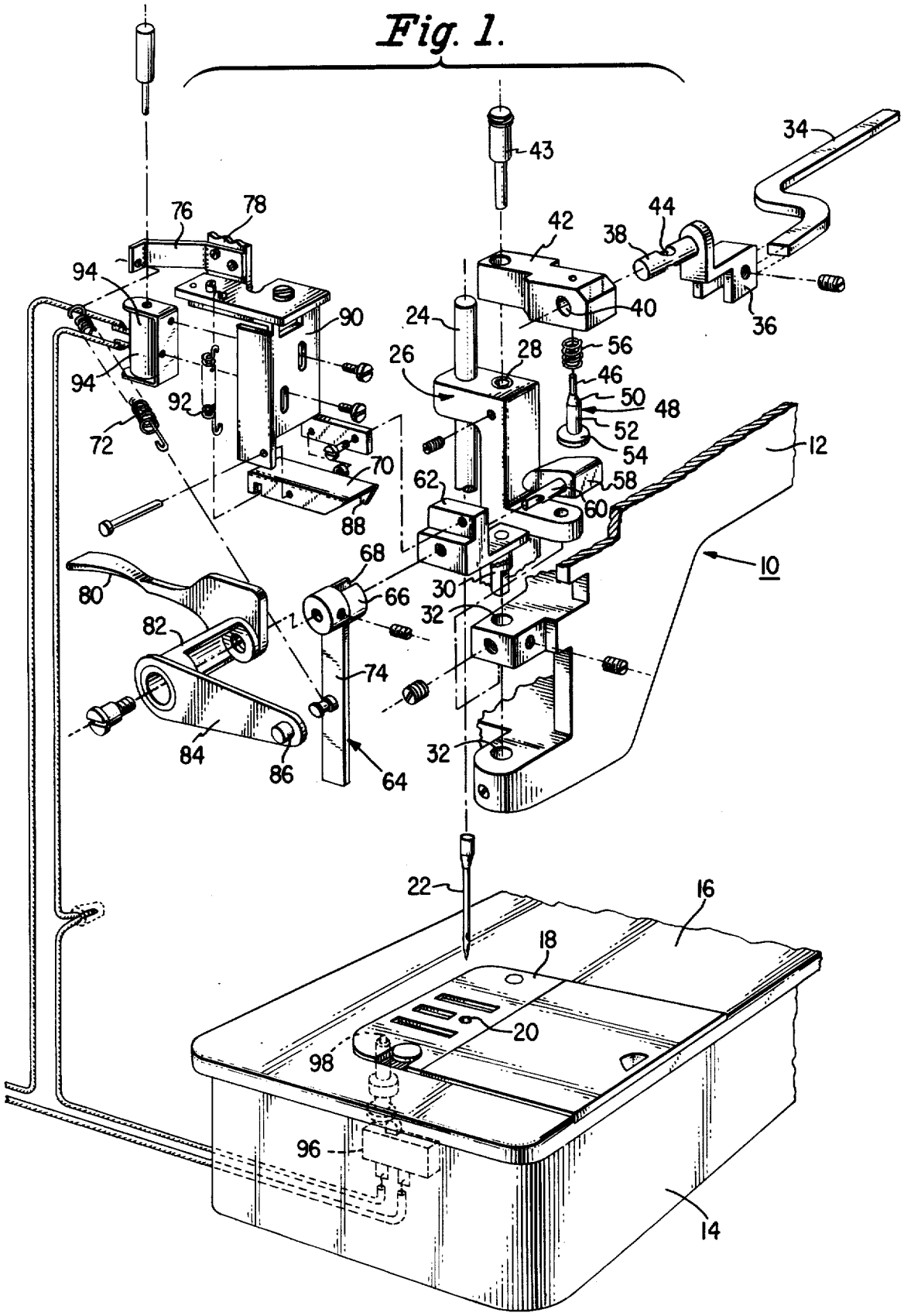
FIG. 1 is an exploded perspective view of a [protion] *portion* of the sewing mechanism of a sewing machine.
Figures 2, 3:
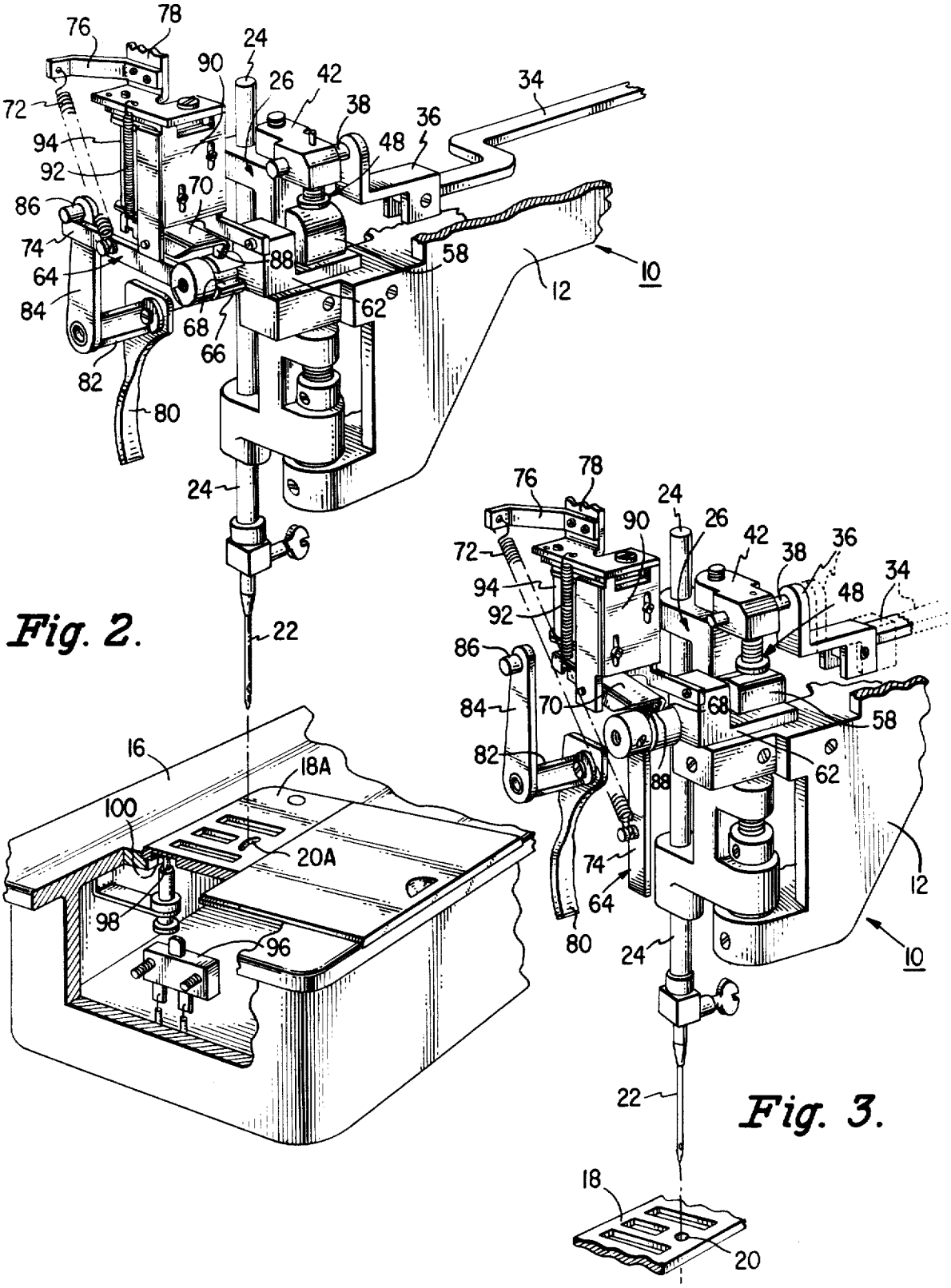
FIG. 2 is a perspective view of a portion of the sewing mechanism illustrating said mechanism in a zig-zag mode of stitching.
FIG. 3 is a perspective view of a portion of a sewing machine mechanism illustrating said mechanism in a straight stitch mode of sewing.

Referring to the drawings wherein there is illustrated a preferred embodiment of the invention, particularly with reference to FIG. 1, there is shown therein a portion of a sewing machine frame 10 including a bracket arm 12, a work bed 14 having a work bed surface 16 with a straight stitch throat plate 18 disposed therein. The throat plate 18 is provided with an aperture 20 which as viewed in FIG. 1 is substantially circular and relatively small, for receiving a needle 22 during straight stitch sewing wherein the needle has substantially straight line motion. The needle 22 is supported in a needle bar 24 which in turn is journaled in a pivotably mounted bracket 26 intermediate its length and adjacent its upper end, which bracket 26 is journaled in a portion of the bracket arm 12 for pivotal movement, as illustrated in FIGS. 2 and 3 wherein it is shown that the bracket 26 is supported relative to bores 32 for pivotal motion relative to the bracket arm 12. During operation of the sewing machine, the needle bar 24 is reciprocated in an endwise motion in the normal manner, as for example by an arm shaft connected in the usual manner to a sewing machine motor and having a crank at one end thereof connected to the needle bar for initiating reciprocating motion thereof. Reference may be made to U.S. Pat. No. 3,782,311 wherein there is illustrated one such type of said mechanism for reciprocating the needle bar.

In order to initiate relative lateral movement of the needle bar mechanism for producing zig-zag stitching a jogging mechanism is provided which includes an actuator member 34 having a link 36 supported at one end thereof, as illustrated in the drawings, which link 36 has a pin 38 extending therefrom and disposed in a bore 40 in one end of a rocker bracket 42. The bracket 42 is pinned to the upper end of the needle bar bracket 26 by means of a pin 43 passing through one leg of the bracket 42 and into a bore 28 in the upper needle bar bracket 26 as illustrated in FIG. 1. It will be apparent that if a to and fro motion is initiated by the actuator member 34 this motion may be transmitted through the link 36 to the rocker bracket 42 and to the needle bar bracket 26 so that the needle bar will be swung about the axis of bores 32 and in an arc relative to the throat plate member 18. In FIG. 2 there is shown a throat plate 18a for use with the sewing machine when in a zig-zag mode. As will be seen the throat plate 18a is provided with a throat plate aperture 20a which is elongated to accommodate the needle as it steps over from side to side relative to a center line position for producing zig-zag stitches.

The pin 38 on the link member 36 is formed slightly smaller than the diameter of the bore 40 and the rocker bracket 42. Therefore, the pin 38 may move freely back and forth within the bore 40 without initiating rocking motion to the rocker bracket 42. In order to transmit motion from the link 36 to the rocker bracket 42, an arrangement is provided for selectively coupling the pin 38 to the rocker bracket 42 within the bore 40. Referring to FIG. 1, the pin 38 is provided with a slot 44 substantially intermediate its length which slot 44 has a length substantially equal to the maximum distance of throw of the actuator member 34. When disposed in assembled relationship, the pin 38 is received in the bore 40 in a manner wherein the slot 44 is positioned for receiving a pin 46 of a coupling member 48. As will be more fully explained hereinafter, the pin 46 is disposed in the slot 44 so that it is always positioned within the slot irrespective of whether or not the coupling member 48 is positioned for coupling the link 36 to the rocker bracket 42 or when such elements are in an uncoupled relationship.

As best seen in FIG. 1, the coupling member 48 has a conically shaped portion directly below the pin 46 the outer slopping surface of which forms a cam surface 50 for locating the coupling member 48 within the slot 44 of the pin 38 as will be explained in greater detail below. Directly below the conical portion 50 is a cylindrical or barrel shaped portion 52 which terminates in a flange portion 54. A spring 56 surrounds the cylindrical portion 52 and rests against the flange 54 and serves to urge the coupling member 48 out of coupling engagement with the pin 38 and rocker bracket 42. The coupling member 48 rests on a cam member 58, as shown in FIGS. 2 and 3, which cam member 58 is fixed to a pivotally mounted shaft 60. The shaft 60 passes through a bracket member 62 which is suitably supported in the frame 12 as by post 30 received in bore 32 and has a needle bar release cam lever 64 secured at its opposite end for initiating pivotal movement of said shaft 60. Also fixed to the shaft 60 intermediate the bracket member 62 and the release lever 64 is a cylindrical member 66 having a slotted portion 68 therein for receiving a latching pawl 70, as will be more fully explained hereinafter. The needle bar release cam lever 64 is biased toward a position for coupling the zig-zag mechanism into the zig-zag mode by means of a spring 72 which is attached to an arm 74 of said cam lever at one end thereof and to a bracket 76 fixed in turn to a bracket 78 which is suitably fixed to the machine frame. As seen in FIG. 2, the arm 74 of the needle bar release cam lever 64 is normally biased to a substantially horizontal position by the spring member 72 and the cam member 58 is so fixed on the shaft 60 such that when the needle bar release cam lever is in such position the cam member will urge the coupling member 48 into a position for engaging the coupling link 36 with the rocker bracket 42.

As is customary in sewing machines a presser mechanism is provided for raising and lowering a presser foot, which presser foot has for its function holding the work down against the throat plate during sewing. The presser foot and the complete mechanism for raising and lowering the same are not shown or described herein but reference may be made to U.S. Pat. No. 3,782,311 for a presser mechanism of the type which may be used with the present invention. As illustrated in the drawings, a presser bar mechanism control member or lever 80 is shown and which is suitably mounted to the needle bar release lever 64, as illustrated, for pivotal movement between a substantially vertical position and a horizontal position for raising and lowering the presser foot in a known manner. A shaft 82 is fixed at one end thereof to the lever 80 and has fixed at its other end a link member 84 which link member 84 has a pin 86 extending from one face thereof at its end opposite from the end to which it is fixed to the shaft 82. As best seen in FIG. 2, the link 84 and its pin 86 are disposed relative to the shaft 82 such that the pin 86 will rest on one edge of the arm 74 of the needle bar cam release lever so that when the lever 80 is raised from a vertical position to a horizontal position or from the position shown in FIG. 2 to the position shown in FIG. 1, the pin 86 will ride on the edge of the arm 74 and pivot the needle bar release cam lever 64 in opposition to the bias of the spring 72. When the needle bar release cam lever 64 is thus positioned the cam member 58 will be pivoted to a position wherein it exerts no camming pressure on the coupling member 48 so that the force of the spring 56 disposed around the coupling member 48 will urge said coupling member 48 in a direction away from the rocker bracket 42 whereby only the pin portion 46 of the coupling member 48 will remain in the slot 44 of the link 36 so that the link 36 can oscillate in a to and fro motion substantially to the extent of the length of the slot 44 without imparting any motion to the rocker bracket 42.

If it should be desired to operate the sewing machine in the zig-zag mode, the control lever 80 may be returned to its vertical position as illustrated in FIG. 2, whereupon the tension in a spring 72 will pivot the needle bar cam release lever 64 to its position illustrated in FIG. 2 whereupon the cam member 58 will be pivoted to a position for urging the control member 48 into coupling engagement with the actuator 34 and the rocker bracket 42. It will be appreciated that the pin 38 of the link member 36 must be in a position for receiving the coupling member 48 to insure that the respective elements are coupled together. According to the present invention means are provided for insuring that the pin member 38 and the slot 44 are in the proper position for the coupling sequence. The actuator member 34 may be of the mechanical type wherein one end of the actuator is responsive to a cam follower riding on a mechanical cam element or said actuator 34 may be an element of an electromagnetic jogging mechanism. In the latter case means may be provided for insuring that the actuator 34 is in a position wherein the needle would rest in its center most position. That is, a logic circuit may be provided whereby whenever the machine is at rest or is switched from one mode to the other, the actuator 34 is always positioned in a needle center position as opposed to an extreme left or right zig-zag position. Reference may be made to the aforementioned U.S. application Ser. No. 520,084 *(now U.S. Pat. No. 3,926,133)* wherein there is described both a mechanical type jogging mechanism and one of the electromagnetic type with an example of circuit means for centering the actuator. In addition to the aforementioned means for insuring that the pin 38 is in a proper position for coupling, according to the present invention as described above, the pin 46 on the coupling member 48 is always maintained within the slot 44 in the pin 48, even during uncoupling. When the coupling member is elevated in response to the cam member 58, the cam portion or cam surface 50 on the coupling member 48 will engage an inner surface of the slot 44 and cam the pin 38 and link 36 into the center position so that the cylindrical portion 52 of the coupling member 48 may now pass into the slot 44 for completing the coupling engagement. Thus, it will be seen, that irrespective of the last position of the actuator 34 and the link 36 prior to a reinitiation of a zig-zag mode, the construction of the coupling member 48 in combination with the size and shape of the slot 44 in the pin 38 will always insure that the coupling member 48 will be received in said slot 44 for coupling the respective elements together.

If it is now desired to change from the zig-zag mode to the straight stitch mode, it will be necessary to raise the presser mechanism control lever 80 to lift the presser foot in the usual manner and exchange the zig-zag throat plate 18a for a straight stitch throat plate 18. As explained above upon lifting the control member 80 the needle bar release cam lever is pivoted along with the cam member 58 so that the cam member 58 no longer urges the coupling member 48 into coupling engagement and thus permits the spring 56 to urge the coupling member 48 in a direction so that it is not in positive engagement with the pin 38 and the rocker bracket 42. At this time the jogging mechanism will be effectively disconnected from the needle bar mechanism so that upon turning the machine on no zig-zag motion of a needle will be produced. In order to insure that the mechanism remains in the straight stitch mode, *that is, with the needle constrained in alignment with the throat plate needle hole as shown in FIG. 2 by abutment of the cam member 58 against the needle bar bracket 26,* and that no zig-zag motion is produced, a locking means is provided for locking the latching mechanism including the cam member 58, the needle bar release cam member 64 and coupling member 48 into an unlatched position. The locking means or mechanism includes a tooth 88 on the latching pawl 70 which is disposed for engagement in the slot 68 in the pawl receiving cylinder 66. The latching pawl 70 is pivotally supported on a bracket member 90 which along with the bracket member 78 is suitably fixed to the machine frame. As best shown in FIG. 1, it will be seen that the pivot point of the latching pawl 70 is substantially at its mid-point and that a spring 92 is connected adjacent the end of the latching pawl 70 opposite from the tooth 88 which spring 92 is fixed at its other end to the bracket 78 for urging the latching pawl in a clockwise pivotal direction or towards a position for engagement with the slot 68 in the pawl receiving cylinder 66. Therefore, when the control lever 80 is elevated to pivot the needle bar release cam lever to its substantially vertical position, as illustrated in FIG. 1, the slot 68 in the pawl receiving cylinder 66 will rotate to a position wherein the tooth 88 of the latching pawl will drop into said slot 68. Upon return of the control member 80 to its vertical position the pin 86 on the link 84 will now leave the surface of the needle bar release cam lever 64 but the needle bar release cam lever will now be locked into its vertical position wherein the cam member 58 is ineffective for urging the control member 48 into coupling engagement. Therefore it will be seen that whenever the presser bar mechanism control lever 80 is raised the latching mechanism will be positioned for uncoupling the jogging mechanism from the needle bar mechanism and the locking means will lock the latching mechanism in the unlatched position.

In order to unlock the locking mechanism and return the elements of the latching mechanism to a position wherein zig-zag motion may be reinstituted, means are provided in response to a change in the throat plate to unlock the locking mechanism. The aforementioned means comprises a solenoid 94 which is suitably fixed to the bracket 90 and is disposed adjacent the latching pawl 70 and is coupled therewith so that upon actuation of the solenoid 94 the armature will exert a force on the rear portion or the portion opposite to the tooth 88 and initiate a counter clockwise motion in opposition to the force of spring 92 which will thereby uncouple the tooth 88 from the slot 68 in the pawl receiving cylinder 66 and permit the needle bar cam release lever to return to its substantially horizontal position under exertion of the spring 72 and consequently pivot the camming member 58 into a position for urging the coupling member 48 into coupling engagement with the jogging mechanism and the needle bar mechanism. Energization of the solenoid 94 is brought about by actuation of a switch member 96 positioned in the work bed 14 and directly underneath a portion of the work bed surface wherein the throat plate is received. The switch 96 includes a plunger 98 which acts to permit the switch 96 to move to a closed position when the plunger is in a raised position and acts to move the switch 96 to an open position when lowered. As seen in FIG. 2, the zig-zag throat plate 18a is provided with a cut-out portion or an opening 100 which when a zig-zag throat plate is in position on the work bed surface 16 permits the plunger 98 of the switch 96 to raise and as a result the switch 96 will close and energize the solenoid 94. The straight stitch throat plate 18 as shown in FIG. 1 does not have such an opening and when such throat plate 18 is in position on the work bed surface 16 the plunger 98 will be depressed and thereby move the switch 96 to an open position so that the solenoid 94 is not energized.

The operation of the invention is substantially as follows. Assuming the sewing machine to be turned on and a zig-zag mode selected, if it is necessary to change the throat plates from a straight stitch throat plate to a zig-zag throat plate. The presser mechanism control lever 80 is raised whereupon, as explained above the latching mechanism will be positioned for uncoupling the jogging mechanism from the needle bar mechanism and the locking means will be in a position for locking the latching mechanism in the unlatched position. Upon removal of the straight stitch throat plate 18 and insertion of the zig-zag throat plate 18a the plunger 98 in the switch 96 will be permitted to raise whereupon the solenoid will be energized to unlock the locking mechanism. However, as the control lever 80 of the presser bar mechanism is still in an elevated position the latching mechanism will still be physically locked in the unlatched position. However upon return of the control lever 80 to its lowered position for lowering the presser foot into a work engaging position, the control lever 80 will be removed from its position of urging the needle bar release cam lever into an unlatching and will permit said cam lever 64 to return to its substantially horizontal position wherein the camming member 58 is pivoted for urging the coupling member 48 into coupling engagement with the jogging mechanism and the rocker bracket 42. If it is now desired to change to a straight stitch mode of stitching, the control lever 80 of the presser bar mechanism is again raised wherein the latching mechanism will be held by said control lever through link 84 and pin 86 in an unlatched condition. The zig-zag throat plate 18a is now removed and a straight stitch throat plate 18 inserted therefor. When the straight stitch throat plate 18 is inserted it will depress the plunger 98 of the switch 96 to open the switch 96 and inactivate the solenoid 94. With the solenoid 94 inactive, the tension in spring 92 will cause the latching pawl member to pivot so that the tooth 98 on the latching pawl 70 will drop into slot 68 of the pawl receiving cylinder 66 for locking the latching mechanism in the unlatched condition. Now upon return of the control lever 80 to a position wherein the presser foot is lowered for engaging the work surface the latching mechanism will be locked by the locking mechanism into an unlatched position so that movement of the actuator 34, if any, will not be transmitted to the rocker bracket 42 and the needle bar mechanism.

It will be seen from the above description that elevation of the presser bar mechanism will move the latching mechanism into an unlatched position each time the control lever 80 thereof is raised and will physically hold the latching mechanism in such position. A locking mechanism is also provided for insuring that the latching mechanism will be locked in the unlatched position whenever a straight stitch throat plate is present. As initially pointed out herein, one advantage of the invention lies in the fact that, when the machine is in a straight stitch mode, the zig-zag mechanism is completely uncoupled from the needle bar mechanism and that no restraining means are required for restraining the zig-zag mechanism from initiating any zig-zag movement during such straight stitch mode. Obviously this eliminates any strain on the elements of the zig-zag mechanism of the sewing machine and should contribute substantially to their operating life. Further, the latching mechanism is responsive to movement of the presser bar mechanism which is normally raised and lowered during changes between the zig-zag mode and the straight stitch mode so that the invention takes advantage of a normal operation of the operator during sewing to initiate an unlatching of the zig-zag mechanism upon selection of a straight stitch mode.

While the invention has been described in detail in its preferred embodiments, it will be understood by those skilled in the art that various modifications and changes may be made therein without departing from the spirit and scope of the invention as described in the appended claims.

Having thus set forth the nature of this invention, what is claimed is:

1. In a sewing machine having a frame, a needle bar disposed for endwise reciprocation in said frame, a needle bar jogging means for selectively initiating relative lateral movement of said needle bar for producing zig-zag stitches whereby the sewing machine is operable in straight stitch and zig-zag modes, a work engaging presser mechanism including control means for selectively lifting said presser mechanism away from a work engaging position and lowering said presser mechanism toward a work engaging position, and means operatively connecting said presser mechanism with said jogging means for disabling said jogging means *and for constraining said needle bar in a predetermined straight stitch position* in response to actuation of said presser mechanism control means.

2. In a sewing machine as recited in claim 1 wherein said means operably connecting said presser mechanism with said jogging means includes latching means for latching said jogging means with said needle bar and said latching means being responsive to movement of said presser mechanism such that upon selective movement of presser mechanism control means to a first position movement of said latching mechanism is initiated for unlatching said jogging means from said needle bar.

3. In a sewing machine as recited in claim 2 wherein said latching means is biased toward a position for latching said jogging means to said needle bar and said presser mechanism control means being effective upon movement to said first position for overcoming the bias of said latching means.

4. In a sewing machine as recited in claim 3 wherein said latching means includes a coupling member operative for coupling said jogging means and said needle bar, said coupling member being biased toward a position for uncoupling said jogging means and said needle bar, a camming member disposed for engagement with said coupling member and said camming member being biased toward a position for urging said coupling member to couple said jogging means and said needle bar.

5. In a sewing machine as recited in claim 4 further comprising locking means for locking said camming member in position when said control means is moved to said first position whereby said coupling member will be uncoupled from said jogging means and said needle bar.

6. In a sewing machine as recited in claim 5 wherein said locking means includes a pawl disposed for engagement with said camming means, said pawl being biased toward a position for positively latching said camming means, and release means for overcoming the bias on said pawl thereby permitting said camming means to move to a position for urging said coupling member to couple said jogging means and said needle bar.

7. In a sewing machine as recited in claim 6 further comprising a work bed surface, throat plate means disposed on said work bed surface and including means for receiving the needle during straight stitch and zig-zag stitch modes of needle operation, switching means responsive to the presence of said throat plate means during one of the straight stitch or zig-zag modes of needle operation, and said release means being responsive to said switching means for enabling release of said pawl from said camming means.

8. In a sewing machine as recited in claim 3 further comprising locking means for locking said latching means in position after movement of said latching means in response to movement of presser mechanism control means to said first position.

9. In a sewing machine as recited in claim 8 further comprising release means for releasing said locking means from said latching means, and said release means being operative only when said sewing machine is in one of the zig-zag or straight stitch modes of stitching.

10. In a sewing machine as recited in claim 9 wherein said release means is operative only in response to a selection of a zig-zag mode of stitching.

11. In a sewing machine having a frame, a needle bar supporting a needle and disposed for endwise reciprocation in said frame, jogging means for initiating relative lateral shifting of said needle bar for producing zig-zag stitches, a work bed surface on the sewing machine, throat plate means disposed on said work bed surface and including means for receiving the needle when in a straight stitch mode [or a zig-zag mode], latching means for latching said needle bar with said jogging means, and selectively operable locking means *for rendering said latching means unlatched and constraining said needle in axial alignment with said means for receiving the needle when in a straight stitch mode,* electromagnetic means operably associated with said locking means and operable in response to the presence of said throat plate means [when in one of the straight stitch or zig-zag modes] *including means for receiving the needle when in a straight mode* for locking said latching means in an unlatched position such that upon actuation of said locking means said jogging means will be disconnected from said needle bar whereby the sewing machine will operate in a straight stitch mode.

12. In a sewing machine as recited in claim 11 wherein said jogging means includes a needle bar jogging member connected to said needle bar, an actuator member disposed for coupling engagement with said jogging member, said actuator member being operable for transmitting jogging motion to said jogging member, and said latching means including a coupling member for coupling said actuator member to said jogging member.

13. In a sewing machine as recited in claim 12 further comprising a presser mechanism for holding the work on said work surface and including control means for selectively lowering and lifting said presser mechanism toward and away from said work surface, and said control means being operative when said presser mechanism is lifted for disengaging said coupling member from said actuating member and said jogging member.

14. In a sewing machine as recited in claim 13 wherein said locking means is operative for locking said coupling member in a disengaged position.

15. In a sewing machine as recited in claim 14 wherein said coupling member is biased toward a position for uncoupling said actuating member from said jogging member and said latching mechanism includes camming means connected to said coupling member and being operative for urging said coupling member into coupling engagement with said actuating member and said jogging member.

16. In a sewing machine as recited in claim 15 wherein said locking means comprises a cam latching pawl, said cam latching pawl being biased toward a position for locking said camming means in a position wherein said camming means in ineffective for urging said coupling member into coupling engagement with said actuator member and said jogging member, and an electromagnetic actuator disposed in operative relationship with said cam latching pawl such that upon energization of said electromagnetic actuator said cam latching pawl is urged into a position for unlocking said camming means.

17. In a sewing machine as recited in claim 16 further comprising switching means disposed in operative association with said throat plate means and said electromagnetic actuator and said throat plate means further including means for activating said switching means when said means for receiving the needle is in one of the straight stitch or zig-zag modes.

18. In a sewing machine as recited in claim 17 wherein said throat plate means comprises first and second throat plate members interchangeable with each other on the work bed surface, and one of said first and second throat plate members including said means for activating said switching means such that when said one throat plate member is disposed on said work bed surface said electromagnetic actuator will be actuated for urging said cam latching pawl to unlock said camming means.

19. In a sewing machine as recited in claim 18 wherein said one throat plate member includes aperture means for receiving reciprocation of the needle when said needle is in the zig-zag mode.

20. In a sewing machine as recited in claim 18 wherein the other of said throat plate members includes aperture means for receiving reciprocation of the needle when said needle is in the straight stitch mode, and said other throat plate member being ineffective for activating said switching means.

* * * * *